United States Patent
Shawhan

[11] 3,889,228
[45] June 10, 1975

[54] TWO-WAY ACOUSTIC TELEMETERING SYSTEM

[75] Inventor: Elbert N. Shawhan, West Chester, Pa.

[73] Assignee: Sun Oil Co., Saint Davids, Pa.

[22] Field: Nov. 16, 1973

[21] Appl. No.: 416,467

[52] U.S. Cl....340/18 FM, 340/18 NC, 340/18 CM, 175/50, 325/9
[51] Int. Cl. .......................................G01v 1/40
[58] Field of Search...340/18 NC, 18 FM, 18 CM, 181/15 TS, 175/50, 325/9 73/152, 73/DIG. 151

[56] References Cited
UNITED STATES PATENTS

| | | | |
|---|---|---|---|
| 3,186,222 | 6/1965 | Martin | 73/151 |
| 3,205,477 | 9/1965 | Kalbfell | 340/18 FM |
| 3,293,607 | 12/1966 | Kalbfell | 340/18 FM |
| 3,593,139 | 7/1971 | Hershberg | 325/9 |
| 3,790,930 | 2/1974 | Lamel et al | 340/18 NC |
| 3,793,632 | 2/1974 | Still | 340/18 NC |

Primary Examiner—Maynard R. Wilbur
Assistant Examiner—N. Moskowitz
Attorney, Agent, or Firm—George L. Church, et al.

[57] ABSTRACT

A system for two-way acoustic signaling along the drill pipe in a borehole, using repeaters at intervals to compensate for signal attenuation in the pipe. All of the repeaters are identical, each functioning to transmit, in response to receipt of one of three possible frequencies, a frequency which is different from the received frequency and is such as to prevent interference between repeaters which transmit on the same frequency. The control of the "transmit" frequency of the repeaters is effected automatically, in each repeater.

13 Claims, 3 Drawing Figures

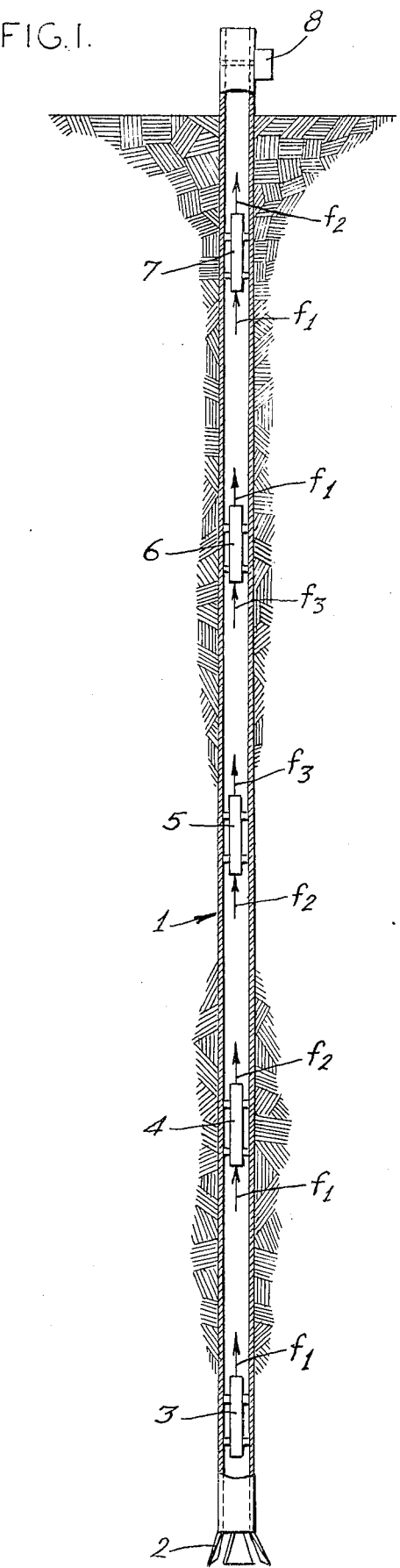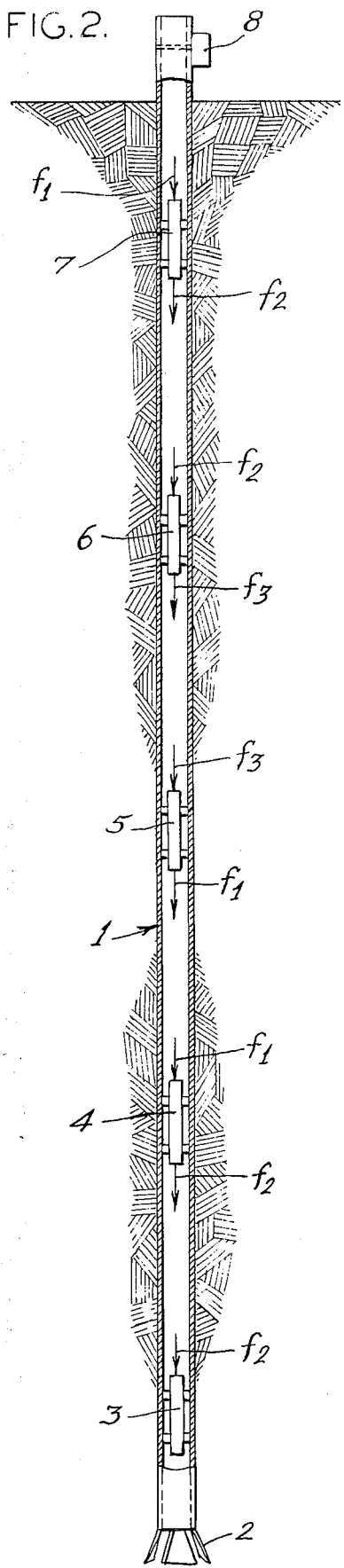

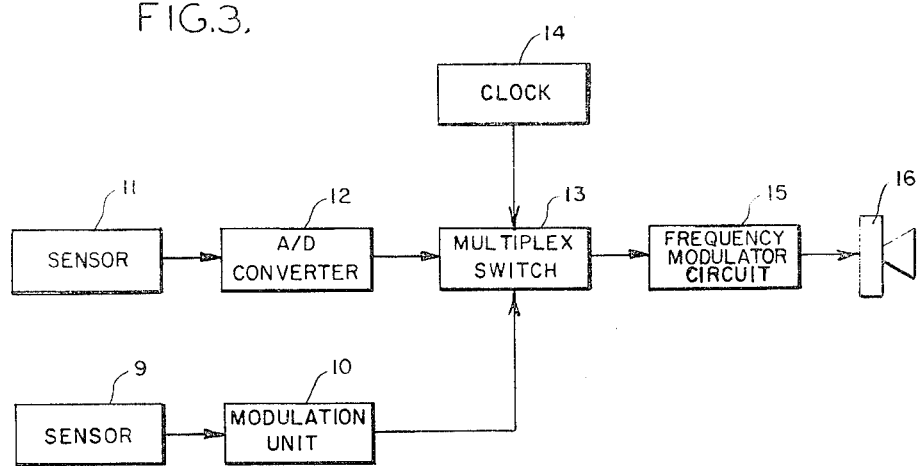
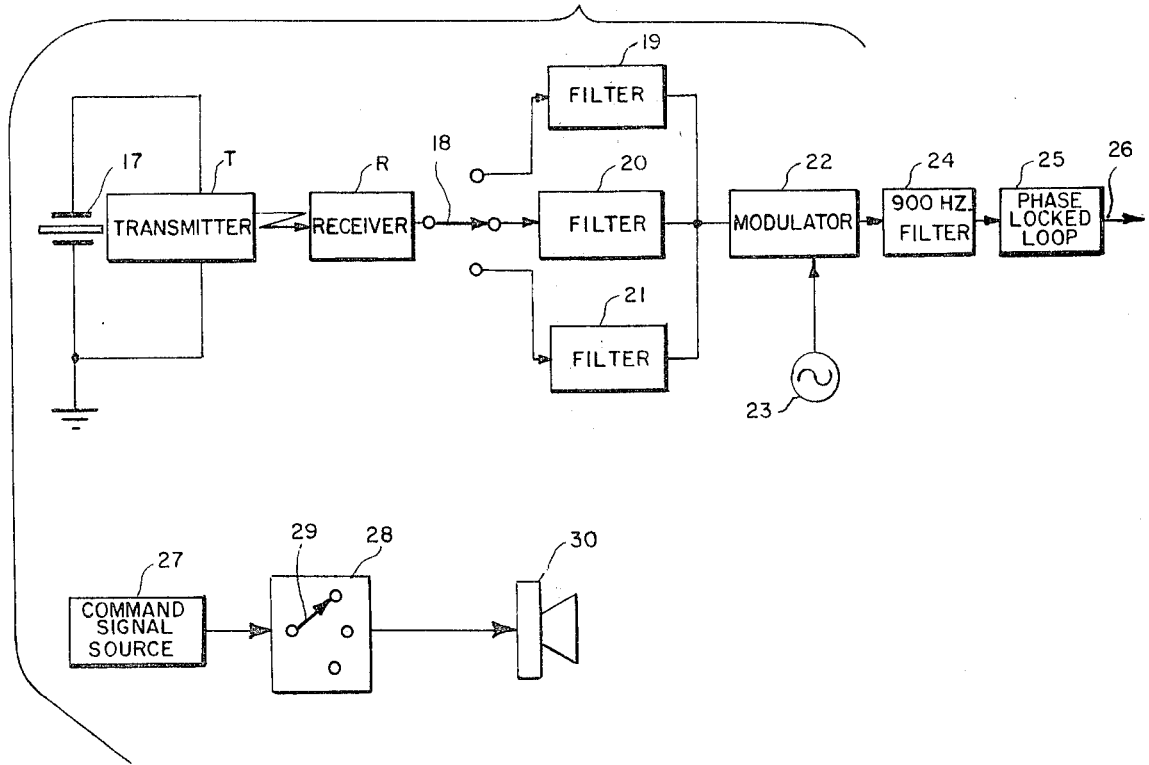

TWO-WAY ACOUSTIC TELEMETERING SYSTEM

This invention relates to an acoustic telemetering system for boreholes, and may be considered to be an improvement over my prior copending application, Ser. No. 390,833, filed Aug. 23, 1973, pending entitled "Telemetering System for Boreholes".

In the prior application, there was described a system for acoustic signaling (telemetering) along a drill pipe, using repeaters to compensate for signal attenuation in the pipe. The prior system operated to provide continuous transmission in one direction only, and used repeaters of three kinds, one receiving at frequency $f_1$ and transmitting at $f_2$, the second receiving at $f_2$ and transmitting at $f_3$, and the third receiving at $f_3$ and transmitting at $f_1$. When arranged in that order, a carrier of frequency $f_1$ reaching the first repeater is passed on to the second, and then to the third, in that direction only. This sequence is necessary to prevent interference between the frequencies transmitted and received by each repeater, and also between frequencies transmitted by adjacent repeaters. In the prior system, the direction of transmission was disclosed as being from downhole to the surface.

In many cases, it is desirable to be able to transmit in both directions. For example, information as received from downhole sensors may indicate the necessity of a change in the frequency of sampling certain sensors (due say to changes in the formation, or in operation of the drill). Considerable time would be saved if these program changes could be effected merely by the transmission of a command signal from the surface to downhole, thus making it unnecessary to withdraw the drill string.

An object of this invention is to provide a novel acoustic telemetering system for boreholes.

Another object is to provide a novel two-way telemetering system for boreholes.

A further object is to provide an improved acoustic transmission system for boreholes which uses identical repeaters.

A still further object is to provide an improved two-way telemetering system for boreholes which employs identical repeaters.

A detailed description of the invention follows, taken in conjunction with the accompanying drawings, wherein:

FIG. 1 is a schematic representation of an acoustic telemetering system according to the invention, illustrating the situation existing when transmitting in the uphole direction;

FIG. 2 is similar to FIG. 1, but illustrating the situation when transmitting in the downhole direction;

FIG. 3 is a block diagram of a downhole instrument unit;

FIG. 4 is a block diagram of a surface unit; and

Figure 5:
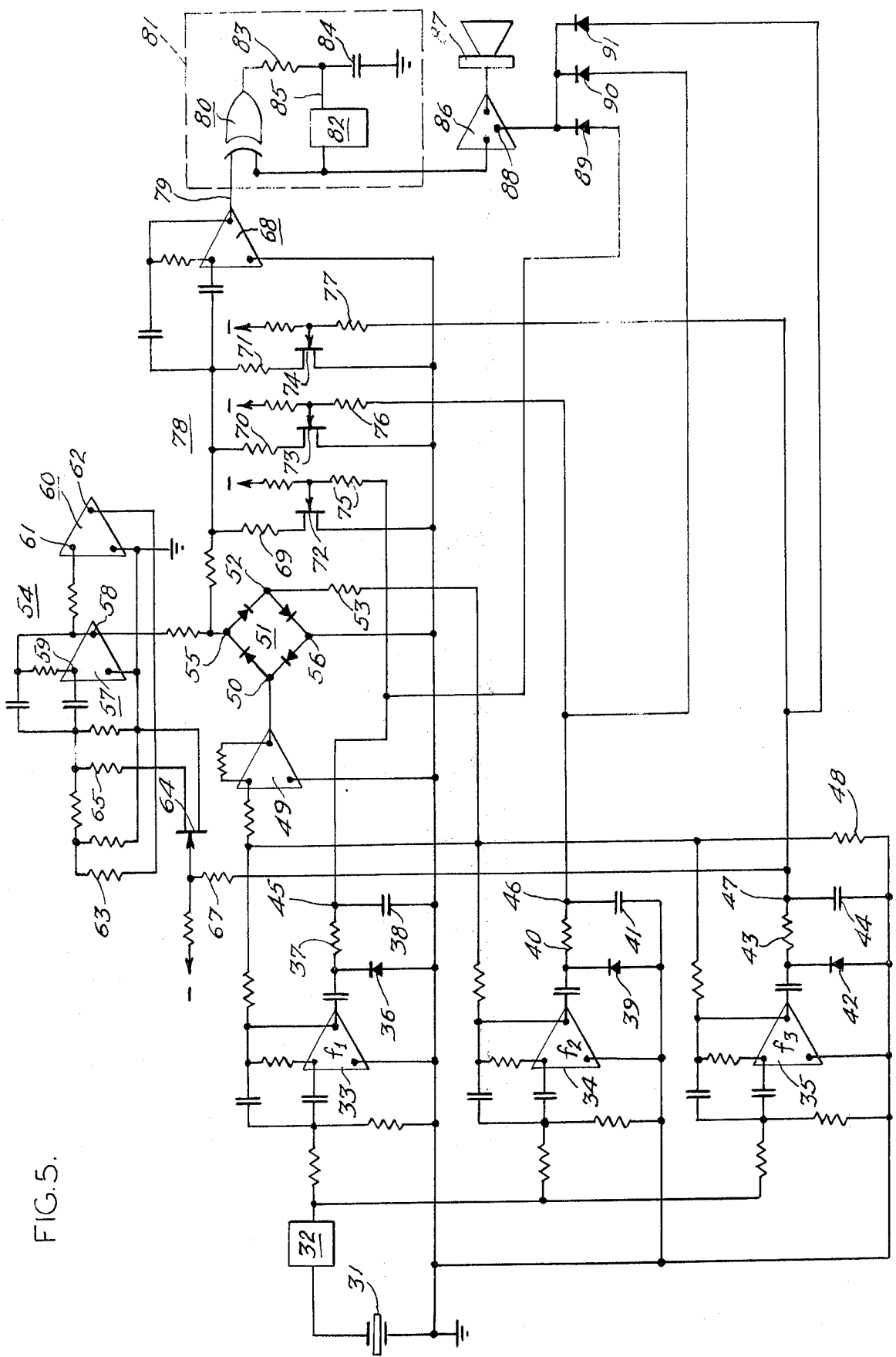
FIG. 5 is a circuit schematic of a repeater.

Speaking generally, the present invention comprises a system for transmitting acoustic signals in a continuous manner through the drill pipe in a borehole (in either direction) by inserting repeaters as necessary, at intervals such as to restore the energy level before it drops too low to be recovered from the noise background. The system to be described uses identical repeaters. The direction of transmission is normally from downhole sensors to the surface. However, the signaling direction can be reversed, on command from the surface, during a pause in transmission at the end of each sequence. Then, when the surface command signal is turned off, the transmission direction returns to normal.

Now referring to the drawings and first to FIG. 1, the numeral 1 generally designates a drill pipe string which comprises a plurality of pipe sections (not separately delineated) coupled together end-to-end with a drill tool or bit 2 disposed at the bottom of the string, all more or less in a conventional manner.

For the purposes of the present invention, however, the drill pipe string is modified to include and accommodate a downhole instrument unit (signal source) 3 which is disposed at or near the drill bit 2 and a plurality of identical repeater units 4, 5, 6, and 7 which are distributed along the length of the drill string for a purpose subsequently explained herein. At the surface, there is provided a surface unit 8 for reading out (so as to display and/or record) signals received from downhole. Details of the various units 3–8 will be described hereinafter.

The system of this invention can operate to provide transmission in either direction. FIG. 1 illustrates the situation during transmission in the uphole direction. In this situation, the downhole unit 3 operates as a signal source to transmit an acoustic carrier (nominal or rest frequency $f_1$) up the drill pipe, by applying the acoustic waves to the drill pipe wall. It should be pointed out that three acoustic frequencies are used in the present system. For purposes for illustration, $f_1$ is taken as 800 Hz, $f_2$ as 1000 Hz, and $f_3$ as 1200 Hz. The acoustic waves traveling upwardly along the pipe reach the first repeater unit 4, where they are picked up by an acoustic receiver contained in this unit, are amplified, and are retransmitted along the pipe, both in the desired upward direction and also downwardly, toward unit 3. The purpose of the repeater units 4–7 is to provide gain to compensate for the loss (signal attenuation) between the several units.

No repeater unit can simultaneously transmit and receive on the same frequency without severe loss of signal information due to mixing of the strong transmitted signal with the weaker incoming signal. Furthermore, if alternate units continuously transmit and receive on the same two frequencies, signals of the same level are received from two sources. For example, if repeaters 4 and 6 both receive on $f_1$ and transmit on $f_2$ while repeater 5 receives on $f_2$ and transmits on $f_1$, repeater 5 will receive $f_2$ signals of equal amplitude from repeaters 4 and 6; because of the time displacement, there will be random cancellation and the modulating information will be lost.

Therefore, three different pairs of transmitted and received frequencies are used in sequence, as follows:

(1) A repeater which receives on $f_1$ will transmit on $f_2$;

(2) A repeater which receives on $f_2$ will transmit on $f_3$; and (3) A repeater which receives on $f_3$ will transmit on $f_1$.

In the uphole transmission frequency scheme of FIG. 1, repeater 4 receives on $f_1$ and transmits on $f_2$, repeater 5 receives on $f_2$ and transmits on $f_3$, repeater 6 receives on $f_3$ and transmits on $f_1$, repeater 7 (like repeater 4) receives on $f_1$ and transmits on $f_2$, and so on (depending on how many repeaters are needed between downhole and the surface). As a result, interference between repeaters which transmit on the same frequency is prevented by the added attenuation resulting from the fact that one of the signals travels twice the distance along the string, as compared to the other. For example, both the repeater 7 and the repeater 4 transmit on $f_2$, while repeater 5 receives on $f_2$; however, the $f_2$ signal which reaches repeater 5 from repeater 7 has had to travel twice as far along the string as the $f_2$ signal which reaches repeater 5 from repeater 4. Therefore, the $f_2$ signal from 7 to 5 is attenuated so much as to be insignificant as compared to the $f_2$ signal from 4 to 5.

If repeater 7 is the one nearest the surface, in FIG. 1 the surface unit 8 receives the carrier at the nominal frequency $f_2$.

FIG. 2 illustrates the situation during transmission in the downhole direction. In this situation, the surface unit 8 operates as a signal source to transmit an acoustic carrier (nominal or rest frequency $f_1$) down the drill pipe. In the downhole transmission frequency scheme of FIG. 2, repeater 7 receives on $f_1$ and transmits on $f_2$, repeater 6 receives on $f_2$ and transmits on $f_3$, repeater 5 receives on $f_3$ and transmits on $f_1$, repeater 4 receives on $f_1$ and transmits on $f_2$, and the downhole or instrument unit 3 (now operating as a signal receiver) receives on $f_2$. In this connection, it will be recalled that in FIG. 1 the downhole or instrument unit 3 operates as a signal source and transmits on $f_1$.

From an examination of FIGS. 1 and 2, it may be seen that each of the repeaters 4-7 must receive one of three possible frequencies (depending on its position in the string) and transmit the signal frequency shown which will avoid interference at its input from the signal it is transmitting, and will also avoid interference from signals received from adjacent repeaters above and below.

One form of a downhole instrument unit 3 (used as a signal source, as in FIG. 1) is illustrated in block diagram form in FIG. 3. A sensor 9 for measuring information downhole develops a signal which is converted to pulse width coding by means of a pulse width modulation unit 10. An example of such a sensor (responsive to inclination of a drilling element) developing pulse width modulation is described in my copending application, Ser. No. 396,627 pending 230 filed Sept. 12, 1973. entitled "High Side Meter". Another sensor 11 responsive to downhole information may develop analog potentials or currents which are converted to digital coding by means of an analog-to-digital converter 12. Any number of coded signals are selected in sequence by a multiplex switch 13 controlled by a clock unit 14.

The signal from the multiplexer 13 is fed to a frequency modulator circuit 15, which may be of the type disclosed in my "Telemetering System" application previously referred to. In the circuit 15, an acoustic (sonic) carrier of frequency approximately 800 Hz ($f_1$) is generated, and the frequency of this (continuous) carrier is switched between two frequencies by the digital or pulse width signal output of multiplexer 13. The frequency shift keyed (FSK) output of modulator 15 is applied to a sound source 16, for conversion into acoustic energy, which is transmitted as compressional waves toward the surface along drill string 1 (FIG. 1). The sound source 16 is preferably of the construction disclosed in my "Telemetering System" application.

An "off" position (period of silence, or carrier off) is ordinarily incorporated in the switching sequence between the sensors 9 and 11 which are controlled by the clock-driven switch 13 in the downhole instrument unit. During this period of time, instructions may be given to the instrument unit, from the surface.

One form of a surface unit 8 is illustrated in block diagram form in FIG. 4. When used as a signal receiver as in FIG. 1, the acoustic signal traveling along the drill pipe is picked up by a signal pickup or receiver 17 (illustrated as a piezoelectric crystal) which is acoustically coupled to the drill string. The receiver 17 is preferably a crystal-type receiver, as described in my "Telemetering System" application. The signal received at the surface is transmitted by means of a radio link involving a transmitter T and a receiver R to a demodulating unit wherein the received signal is fed through a manually-operated selector switch 18 to the input of a selected one of the three filters 19, 20, or 21 which are centered respectively at the frequencies $f_1$, $f_2$, and $f_3$. As illustrated, the filter 20 (centered at frequency $f_2$) is being utilized (since FIG. 1 indicates that the incoming signal at the surface has the frequency $f_2$).

The outputs of the filters 19-21 are all connected together and fed to a balanced modulator 22, to which is also applied (for mixing with the frequency $f_2$, 1000 Hz, of filter 20) a 100 Hz wave from a local oscillator 23. The balanced modulator 22 acts to produce, at its output, sidebands of 1100 and 900 Hz (since the received signal is at 1000 Hz).

The output of the modulator 22 is fed to the input of a 900 Hz filter 24, which passes the 900 Hz sideband to the phase-locked loop 25, the control voltage output of which, at 26, provides a reproduction of the modulation (digital or pulse width modulation) being transmitted from downhole in FIG. 1.

For passing instructions from the surface downhole (as illustrated in FIG. 2), the FIG. 4 arrangement could be used at the surface. A source 27 of command signals (coded instructions) is fed to a frequency modulator 28 which is manually switchable to one of the three center frequencies $f_1$, $f_2$, or $f_3$, as indicated at 29. By way of example (as in FIG. 2), the frequency $f_1$ (800 Hz) is selected for transmission from the surface unit. The output of modulator 28 is applied to a sound source 30 (which, like sound source 16 previously described, is acoustically coupled to the drill string, that is, is in contact with the pipe).

For downhole transmission as in FIG. 2, the downhole apparatus has to include a sound pickup (like pickup 17) and a demodulating unit somewhat similar to the surface demodulating unit previously described in connection with FIG. 4. For the downhole demodulating unit, however, the selector switch 18 is not needed, and only a signal input filter (tuned to the $f_2$ frequency of 1000 Hz; see FIG. 2), instead of the three input filters 19-21.

FIG. 5 shows the essential circuit details of a repeater (since, as previously stated, all of the repeaters are identical, this can be any one of the repeaters 4, 5, 6, or 7). In the repeater unit, an acoustic receiver or pickup 31 is acoustically coupled to the drill string to receive acoustic signals transmitted therealong. Pickup 31 is preferably an accelerometer of conventional type, employing a piezoelectric crystal as a transducing element. The signal from the piezoelectric pickup 31 is amplified and filtered by high-pass and low-pass filters (the preamplifier plus the high-pass and low-pass filters all being indicated by the box 32) which eliminate noise below and above the range of the three frequencies to be received (as previously stated, the repeaters may receive any one of the three frequencies $f_1$, $f_2$, or $f_3$).

Three active band-pass filters, each employing a respective one of the operational amplifiers 33–35, are connected in parallel to the output of the composite unit 32. Each of the band-pass filters mentioned has a very narrow passband, and each is tuned to pass one of the three frequencies. Thus, as indicated, band-pass filter 33 is tuned to pass frequency $f_1$ (800 Hz); band-pass filter 34 is tuned to pass frequency $f_2$ (1000 Hz); band-pass filter 35 is tuned to pass frequency $f_3$ (1200 Hz).

A diode 36, having a resistance-capacitance time constant network 37, 38 at its output, is coupled to the output of the band-pass filter 33. A diode 39, having an RC time constant network 40, 41 at its output, is coupled to the output of the band-pass filter 34. A diode 42, having an RC time constant network 43, 44 at its output, is coupled to the output of the band-pass filter 35. The diodes 36, 39, and 42 cause a positive voltage to appear at one of the points 45, 46, or 47, respectively, depending on which of the three frequencies is present. That is to say, if frequency $f_1$ is received by the repeater, a positive voltage appears at point 45 (by action of diode 36); if frequency $f_2$ is received by the repeater, a positive voltage appears at point 46 (by action of diode 39); if frequency $f_3$ is received by the repeater, a positive voltage appears at point 47 (by action of diode 42). The time constants of each of the networks 37–38, 40–41, and 43–44 are sufficient to exclude bursts of noise in the pass bands.

The outputs of the three filters 33–35 are paralleled across a common load resistor 48. The incoming (received) frequency, passed by a corresponding one of the three filters 33–35, is connected through a phase inverter (phase-inverting amplifier) 49 to one corner 50 of a ring modulator 51, and directly to the opposite corner 52 (over a resistor 53). A frequency shift oscillator, denoted generally by numeral 54, is connected across the remaining corners 55 and 56 (corner 56 being grounded) of the ring modulator 51.

With an input signal frequency of $f_1$ (800 Hz), the shift oscillator 54 must have a frequency of $f_2$ minus $f_1$ (1000–800, or 200 Hz) to develop $f_2$ (1000 Hz) as one of the sidebands. If the input is $f_2$ (1000 Hz), the shift oscillator frequency would be $f_3$ minus $f_2$ (1200–1000, or 200 Hz) to develop $f_3$ (1200 Hz) as one of the sidebands. If the input is $f_3$ (1200 Hz), the shift oscillator frequency would be $f_3$ minus $f_1$ (1200–800, or 400 Hz) to develop $f_1$ (800 Hz) as one of the sidebands. Thus, for the input frequencies of 800, 1000, and 1200 Hz the corresponding shift oscillator frequencies would be 200, 200, and 400 Hz.

The shift oscillator 54 is quite similar in construction to the frequency modulator disclosed in my aforementioned "Telemetering System" application. In the circuit 54, the solid-state operational amplifier 57, which has its output terminal 58 connected back to its inverting input 59 through the resistance-capacitance network illustrated, is used as an active filter tuned to the carrier frequency. Another solid-state operational amplifier 60 has its inverting input 61 coupled to amplifier output terminal 58 and its output 62 coupled back to the input terminal 59 of amplifier 57 by way of a resistor 63.

A number of resistors are connected essentially across the two inputs of amplifier 57 to form a frequency determining circuit; among these is an FET 64 in series between one end of a resistor 65 and ground. The FET 64 operates here as a switch which is opened or closed in response to the rectified output (at 47) of the filter 35, which is tuned to the $f_3$ frequency (1200 Hz). Point 47 is connected to the gate of the FET 64 through a resistor 67. The frequency of oscillator 54 is switched between two frequencies as the FET switch 64 is opened or closed. When there is no positive voltage at point 47 (no $f_3$ or 1200 Hz received by the repeater), the FET switch 64 is open, and the frequency of oscillator 54 is 200 Hz. When $f_3$ or 1200 Hz is received by the repeater, a positive voltage appears at point 47, which closes the switch 64 and shifts the frequency of oscillator 54 to 400 Hz.

A band pass filter 78, comprising an operational amplifier 68 with three resistors 69, 70, and 71 adapted to be connected across its two inputs, follows the ring modulator 51 to select the correct sideband from the modulator output and pass only the carrier frequency to be transmitted. The center of the passband of filter 78 is determined by one of the three resistors 69, 70, or 71, connected in the circuit by the corresponding FET switch 72, 73, or 74. Point 45 is connected to the gate of the FET 72 through a resistor 75; point 46 is connected to the gate of the FET 73 through a resistor 76; point 47 is connected to the gate of the FET 74 through a resistor 77.

When frequency $f_1$ (800 Hz) is received, point 45 is positive, which closes the switch 72 to connect resistor 69 into the circuit; this establishes the center frequency of the passband of filter 78 at 1000 Hz. When frequency $f_2$ (1000 Hz) is received, point 46 is positive, which closes the switch 73 to connect resistor 70 into the circuit; this establishes the center frequency of the passband of filter 78 at 1200 Hz. When frequency $f_3$ (1200 Hz) is received, point 47 is positive, which closes the switch 74 to connect resistor 71 into the circuit; this establishes the center frequency of the passband of filter 78 at 800 Hz.

The output lead 79 from filter 78 provides one of the inputs for a phase comparator 80 contained in a phase-locked loop 81. The purpose of the phase-locked loop 81 is to distinguish between received noise bursts and a persistent signal. The other input for the phase comparator 80 is taken from the output of a voltage-controlled oscillator 82 having a certain free-running frequency.

The phase comparator 80 operates to generate a d.c. control voltage which adjusts the voltage-controlled oscillator 82 to keep its frequency equal to that of the incoming signal (at 79). This control voltage is fed back to the oscillator 82 by way of a resistance-capacitance filter including a series resistor 83 and a shunt capacitor 84, the voltage across the capacitor 84 being fed to the oscillator 82 by way of lead 85.

The time constants of the phase-locked loop 81 can be chosen so that the capture range thereof includes all three frequencies ($f_1$, $f_2$, and $f_3$), and the loop voltage-controlled oscillator 82 locks on the frequency present in the output of filter 78. Noise in the passband of filter 78 is reduced by the time constant of the phase comparator low-pass filter 83, 84. The output of the voltage-controlled oscillator 82 is then essentially at the same frequency as $f_1$, $f_2$, or $f_3$, being $f_2$ when the repeater input is $f_1$, $f_3$ when the repeater input is $f_2$, and $f_1$ when the repeater input is $f_3$. This oscillator output voltage is fed to the input of a power amplifier 86 which drives the sound source 87 (for repeating or relaying of the signal received by the repeater) at the frequency required for transmission from the repeater.

The power amplifier 86 includes a squelch connection 88 the purpose of which is to prevent acoustic transmission until there is a positive voltage at one of the points 45, 46, or 47 (which points are coupled to connection 88 through respective diodes 89, 90, and 91). Thus, acoustic transmission is prevented until one of the frequencies $f_1$, $f_2$, or $f_3$ is received by the repeater at 31. Without this squelch, the sound source 87 would transmit the free-running frequency of the phase-locked loop voltage-controlled oscillator 82.

From FIGS. 1 and 2, it may be seen that the frequencies received and transmitted by each repeater (such as 4-7) depend on its position in the string, the number of repeaters in use, and the direction of transmission. The downhole circuitry (FIG. 3) is simplified if the instrument package 3 always sends and receives on the same frequencies. This restriction can be met by manual switching to the required filters in the receiving and transmitting unit at the surface; this is the reason for the switches 18 and 29 which are illustrated in FIG. 4. For example, if the instrument unit 3 always receives on carrier frequency $f_2$ (FIG. 2) and transmits on carrier frequency $f_1$ (FIG. 1), for the installations illustrated in these figures the surface unit would receive on frequency $f_2$ and transmit on frequency $f_1$. For a somewhat different setup (elimination of repeater 7), the surface unit would be required to receive on frequency $f_1$ and transmit on frequency $f_2$, for the instrument unit to receive on frequency $f_2$ and transmit on frequency $f_1$.

Instructions are always given to the instrument unit 3 (by downhole transmission, as in FIG. 2) during the time when its carrier is turned off. This period of silence would be incorporated in the switching sequence between sensors (such as 9 and 11, FIG. 3) controlled by the clock-driven switch 13 (driven by clock unit 14) in the instrument unit 3.

The invention claimed is:

1. In a system for transmitting acoustic signals in either direction along a string of drill pipe: a plurality of repeaters distributed along said pipe, each repeater having means acoustically coupled to said pipe for receiving acoustic energy of a plurality of nominal frequencies therefrom; means acoustically coupled to said pipe for retransmitting acoustic energy of a plurality of nominal frequencies along said pipe; and means operating in dependence upon the nominal frequency of the energy received for selecting for retransmission from said plurality of nominal frequencies a signal having a nominal frequency different from the nominal frequency received by the same repeater and different from the nominal frequency transmitted by a next repeater along said string in the direction of transmission to avoid interference between signals received at a repeater from adjacent repeaters above and below that same repeater.

2. System of claim 1, wherein all of said repeaters are identical.

3. System according to claim 1, wherein the selecting means in each repeater operates to cause the retransmission of a second nominal frequency upon the picking up of a first nominal frequency, to cause the retransmission of a third nominal frequency upon the picking up of said second nominal frequency, and to cause the retransmission of said first nominal frequency upon the picking up of said third nominal frequency.

4. In a system for transmitting acoustic signals in either direction along a string of drill pipe: a plurality of repeaters distributed along said pipe, each repeater having means acoustically coupled to said pipe for receiving acoustic energy of a plurality of nominal frequencies therefrom and having also means acoustically coupled to said pipe for retransmitting acoustic energy of a plurality of nominal frequencies along said pipe, each repeater including a modulator receptive of signals received by said receiving means and of signals from a local source to produce sum and difference frequency signals, means responsive to the nominal frequency of the energy received up by said receiving means for selecting a corresponding single unique sum or difference frequency signal from the modulator output, and means for feeding the selected sum or difference frequency signal to said transmitter.

5. System of claim 4, wherein all of said repeaters are identical.

6. System according to claim 4, wherein the selecting means in each repeater operates to select a signal of a second nominal frequency from the modulator output in response to the picking up of a first nominal frequency, to select a signal of a third nominal frequency from the modulator output in response to the picking up of said second nominal frequency, and to select a signal of said first nominal frequency from the modulator output in response to the picking up of said nominal third frequency.

7. System defined in claim 4, wherein the selecting means in each repeater comprises a plurality of frequency-selective filters all having their inputs coupled to said receiving means, a separate controlling means coupled to the output of each filter and responsive to such output for developing a control signal upon the appearance of an output in the corresponding filter, and controllable tuning means connected to the output of said modulator and controlled by the controlling means.

8. System defined in claim 4, wherein the selecting means in each repeater comprises a plurality of frequency-selective filters all having their inputs coupled to said receiving means, a separate voltage-developing means coupled to the output of each filter and responsive to such output for developing a voltage upon the appearance of an output signal in the corresponding filter, and voltage-responsive tuning means connected to the output of said modulator and controlled by the voltage-developing means.

9. System defined in claim 4, wherein the selecting means in each repeater comprises a plurality of frequency-selective filters all having their inputs coupled to said receiving means and all having their outputs coupled to said modulator.

10. System of claim 4 wherein the frequency of the local source of signals is shiftable in response to receipt by said receiving means of energy of a particular predetermined nominal frequency.

11. System defined in claim 4 wherein the feeding means in each repeater includes a squelch arrangement for preventing transmission of acoustic energy from said transmitting means in the absence of receiving acoustic energy by said receiving means.

12. System defined in claim 4, wherein the feeding means in each repeater includes a phase-locked loop connected between the modulator output and the repeated acoustic transmitting means and including a voltage-controlled oscillator together with means for locking its frequency to that selected from the modulator output.

13. System according to claim 4 wherein the selecting means in each repeater operates to select a signal of a second nominal frequency from the modulator output in response to receiving a first nominal frequency, to select a signal of a third nominal frequency from the modulator output in response to receiving said second nominal frequency, and to select a signal of said first nominal frequency from the modulator output in response to receiving said third nominal frequency; and wherein the feeding means in each repeater includes a phaselocked loop connected between the modulator output and the repeater acoustic transmitting means and including a voltage-controlled oscillator together with means for locking its frequency to that selected from the modulator output.

* * * * *